US006703941B1

(12) United States Patent
Blaker

(10) Patent No.: US 6,703,941 B1
(45) Date of Patent: Mar. 9, 2004

(54) TRAINABLE TRANSMITTER HAVING IMPROVED FREQUENCY SYNTHESIS

(75) Inventor: David A. Blaker, Holland, MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/369,390

(22) Filed: Aug. 6, 1999

(51) Int. Cl.[7] .................................................. H04Q 1/00

(52) U.S. Cl. ............. 340/825.69; 341/176; 340/825.72; 455/115

(58) Field of Search ........................ 340/825.69, 825.72, 340/825.22, 825.12, 825.2, 825.31; 455/151.2, 115; 341/176, 781

(56) References Cited

U.S. PATENT DOCUMENTS

| | | | | |
|---|---|---|---|---|
| 5,379,453 A | | 1/1995 | Tigwell | |
| 5,442,340 A | | 8/1995 | Dykema | |
| 5,479,155 A | | 12/1995 | Zeinstra et al. | |
| 5,487,183 A | * | 1/1996 | Nanni et al. ................ | 455/115 |
| 5,564,101 A | | 10/1996 | Eisfeld et al. | |
| 5,583,485 A | | 12/1996 | Van Lente et al. | |
| 5,614,885 A | | 3/1997 | Van Lente et al. | |
| 5,619,190 A | | 4/1997 | Duckworth et al. | |
| 5,627,529 A | | 5/1997 | Duckworth et al. | |
| 5,646,701 A | | 7/1997 | Duckworth et al. | |
| 5,661,651 A | | 8/1997 | Geschke et al. | |
| 5,661,804 A | | 8/1997 | Dykema et al. | |
| 5,680,263 A | | 10/1997 | Zimmermann et al. | |
| 5,686,903 A | | 11/1997 | Duckworth et al. | |
| 5,699,054 A | | 12/1997 | Duckworth | |
| 5,699,055 A | | 12/1997 | Dykema et al. | |
| 5,764,697 A | * | 6/1998 | Sakuma et al. ............. | 375/239 |
| 5,793,300 A | | 8/1998 | Suman et al. | |
| 5,854,593 A | | 12/1998 | Dykema | |
| 5,903,226 A | | 5/1999 | Suman et al. | |
| 6,131,019 A | * | 10/2000 | King ........................... | 455/99 |

FOREIGN PATENT DOCUMENTS

| | | | |
|---|---|---|---|
| EP | 0 926 648 | * | 6/1999 |
| IT | 1261150 | | 12/1993 |
| WO | 9402920 | | 2/1994 |

* cited by examiner

*Primary Examiner*—Brian Zimmerman
(74) *Attorney, Agent, or Firm*—Foley & Lardner

(57) ABSTRACT

A trainable transmitter comprises a receiver, a signal generator, and a processor. The receiver receives a signal from a transmitter. The signal generator generates a signal having a frequency related to a frequency control signal supplied to a frequency control terminal of the signal generator. The processor is directly coupled to the frequency control terminal of the signal generator for supplying the frequency control signal and directly coupled to an output terminal of the signal generator for monitoring the frequency of the signal output from said signal generator.

46 Claims, 13 Drawing Sheets

FIG. 15
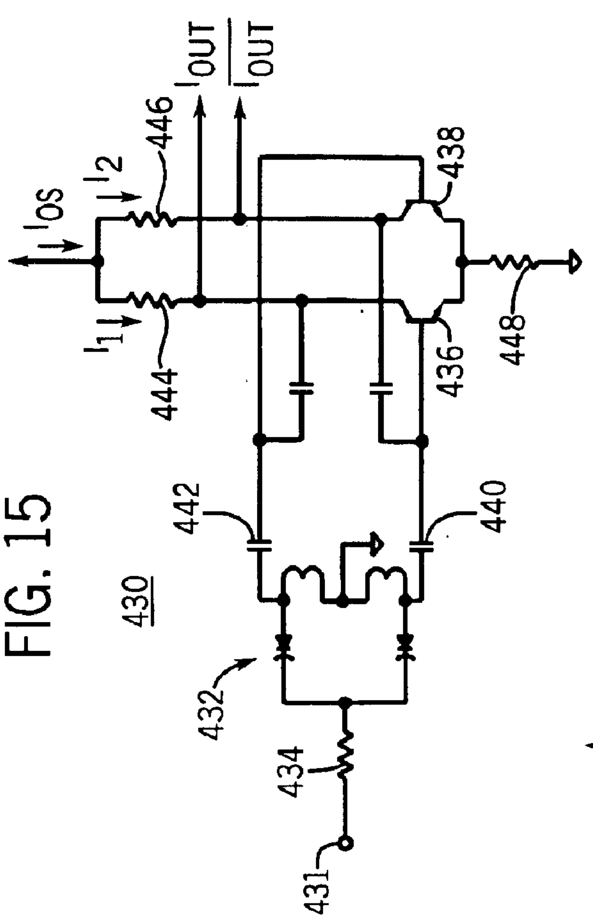
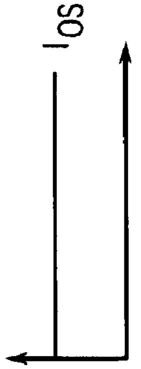
FIG. 16A
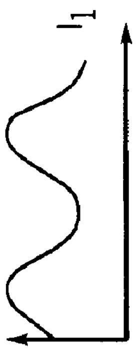
FIG. 16B
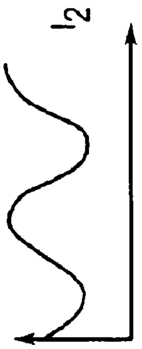
FIG. 16C
FIG. 18
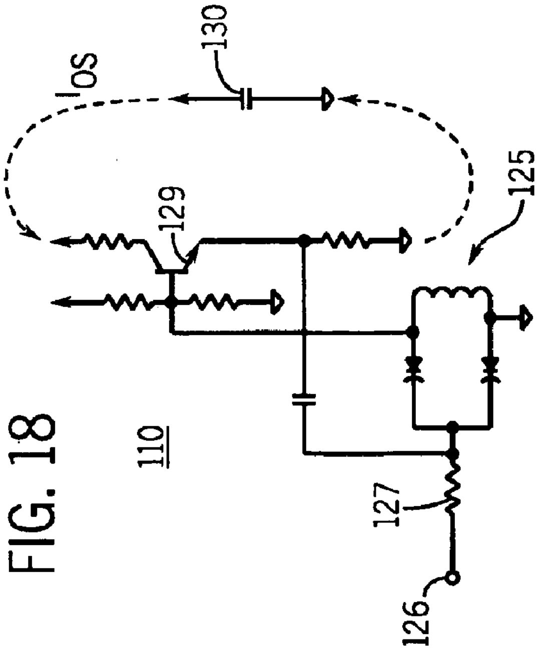
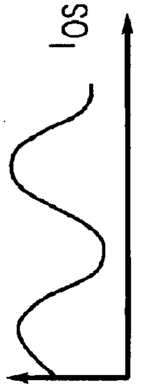
FIG. 19

TRAINABLE TRANSMITTER HAVING IMPROVED FREQUENCY SYNTHESIS

BACKGROUND OF THE INVENTION

The present invention generally relates to radio frequency (RF) trainable transmitters that are capable of learning the characteristics of a received RF signal, storing the characteristics in memory, and re-creating and transmitting the learned signal based upon the stored characteristics.

RF trainable transmitters have many applications. The primary application is to physically and permanently incorporate the trainable transmitter in a vehicle accessory, such as a visor, rearview mirror, or overhead console, in order to allow the trainable transmitter to be used to learn a garage door opening RF signal for subsequent transmission to the garage door opening mechanism mounted in a garage. As disclosed in U.S. Pat. No. 5,903,226, another application of RF trainable transmitters is to control household lights and appliances.

RF trainable transmitters are capable of learning the RF carrier frequency, modulation scheme, and data code of an existing portable remote RF transmitter associated with an existing receiving unit located in the vehicle owner's garage. Thus, when a vehicle owner purchases a new car having such a trainable transmitter, the vehicle owner may train the transmitter to the vehicle owner's existing clip-on remote RF transmitter without requiring any new installation in the vehicle or home. Subsequently, the old clip-on transmitter can be discarded or stored.

Because the trainable transmitter is an integral part of a vehicle accessory, the storage and access difficulties presented by existent clip-on remote transmitters are eliminated. Some examples of trainable transmitters are disclosed in U.S. Pat. Nos. 5,442,340; 5,479,155; 5,583,485; 5,614,885; 5,614,891; 5,619,190; 5,627,529; 5,646,701; 5,661,651; 5,661,804; 5,686,903; 5,699,054; 5,699,055; and 5,708,415, as well as in U.S. Pat. Nos. 5,903,22 and 5,854,593, all of which are commonly assigned to Prince Corporation.

A block diagram representing a typical RF trainable transmitter is shown in FIG. 1. As described in more detail below, the RF trainable transmitter includes a signal generator 10 for generating the signals to be transmitted and for generating a reference signal used during the training process to identify the RF carrier frequency and to demodulate the received signal. Signal generator 10 operates under control of a microprocessor 16, which selects the carrier frequency of the signal generated by signal generator 10 by applying a signal frequency control signal to input terminal b of signal generator 10. Microprocessor 16 may also cause signal generator 10 to modulate the generated signal in accordance with a DATA signal applied to input terminal a of signal generator 10. When transmitting a modulated signal, signal generator 10 outputs the modulated signal to a transmit amplifier 27 through output terminal d. The modulated signal is thus amplified and passed to an antenna 2 that transmits the RF signal as signal B to a remotely controlled apparatus 6.

When the trainable transmitter is receiving a signal A from an original remote control transmitter 4 during the training mode, the received signal is fed from antenna 2 to an input of a mixer 8. A reference signal output from terminal c of signal generator 10 is supplied to a second input of mixer 8. Mixer 8 mixes the reference signal and the received signal A to generate a mixed output signal. The mixed output signal passes through a bandpass filter 12 and a processing circuit 14 to an input of a microprocessor 16 where it is further processed.

The RF trainable transmitter also includes user input switches 18 coupled to microprocessor 16 through a switch interface circuit 20, to allow the user to initiate either training of a signal or transmission of a signal. Additionally, one or more light emitting diodes (LEDs) 22 or some other display or indicator circuit may be coupled to an output of microprocessor 16 to provide feedback information to the user. The RF trainable transmitter also includes a power supply circuit 24 that may be permanently or detachably coupled to the battery of a vehicle.

The RF trainable transmitter shown in FIG. 1 typically operates in either a training mode or a transmit mode. To cause the trainable transmitter to enter the training mode, a user presses one of switches 18. Upon detecting that a switch 18 has been depressed for a predetermined time period, microprocessor 16 enters the training mode. During the training mode, the user activates original remote control transmitter 4 associated with a garage door opening mechanism (e.g., remotely controlled apparatus 6) to cause original remote control transmitter 4 to transmit the signal to be learned (A). While signal A is transmitted, microprocessor 16 first identifies the carrier frequency of signal A.

To identify the RF carrier frequency of the received signal, microprocessor 16 generates and supplies a frequency control signal (FREQ) to input terminal b of signal generator 10. Signal generator 10 responds to the frequency control signal by generating an unmodulated RF reference signal having a frequency dictated by the frequency control signal received from microprocessor 16. Antenna 2 supplies the RF reference signal to mixer 8, which mixes the reference signal with the received signal A. Mixer 8 outputs a signal including the data code encoded in the received RF signal and having a carrier frequency that is equal to the difference between the carrier frequencies of the received RF signal and the RF reference signal. Narrow bandpass filter 12 is provided to pass a signal only when the carrier frequency of the signal from mixer 8 is 10.7 MHz. The output of bandpass filter 12 is passed through a processing circuit 14 back to microprocessor 16. In this manner, microprocessor 16 can selectively vary the carrier frequency of the RF reference signal output from signal generator 10 until a signal is detected from processing circuit 14. When a signal is detected from processing circuit 14, microprocessor 16 will know that the carrier frequency of the received RF signal is 3 MHz different from the known carrier frequency of the RF reference signal. Once microprocessor 16 identifies and verifies the carrier frequency, it stores the value of the frequency control signal in its internal memory and digitizes and stores the data code that is demodulated by processing circuit 14.

Subsequently, when a user wishes to cause the trainable transmitter to transmit a signal (B) to the garage door opening mechanism 6, the user presses the associated switch 18 to instruct microprocessor 16 to begin transmitting the RF signal. Microprocessor 16 responds by reading the frequency data from its memory and providing a corresponding frequency control signal to signal generator 10, while also reading from its memory the data code at the same rate at which it was recorded and supplying this data signal (DATA) to input terminal a of signal generator 10. Signal generator 10 then generates a carrier signal having the selected frequency and modulates the amplitude of the signal with the data signal supplied from microprocessor 16. This modulated RF signal (B) is output through antenna 2 to the remotely controlled garage door opening mechanism 6. It should be noted that a plurality of switches 18 is provided to enable a plurality of signals to be learned and subsequently transmitted.

An early version of an RF trainable transmitter is disclosed in U.S. Pat. No. 5,614,885. In this version, signal generator 10 was generally constructed as shown in FIG. 2. Specifically, signal generator 10 employed a voltage controlled oscillator (VCO) 110, which generates a sinusoidal signal having a frequency dictated by the analog voltage level applied at its voltage control input terminal. To allow microprocessor 16 to control the voltage level applied to the voltage control input of VCO 110 using a digital value that may easily be stored in its memory, the output of VCO 110 is fed back through a divide-by-128 circuit 111 as well as a divide-by-N circuit 112 and is mixed by mixer 114 with a reference signal of fixed frequency as generated by a reference oscillator 113. The value of N by which divide-by-N circuit 112 divides the frequency of the signal supplied thereto is provided from microprocessor 16. The output of mixer 114 is supplied to a frequency discriminator circuit 115 that converts the received signal to a voltage signal that has a level corresponding to the frequency of the signal output from mixer 114. Thus, by changing the value of N, microprocessor 16 can effectively adjust the voltage level input to VCO 110 and thereby select the frequency of the signal output from VCO 110.

To modulate the signal output from VCO 110, a switching transistor 116 is provided between the output of VCO 110 and antenna 2. Switching transistor 116 is switched on and off in response to the data signal supplied from microprocessor 16. In this manner, an amplitude-modulated (AM) signal may be generated and supplied to antenna 2 for transmission to the garage door opening mechanism 6.

A problem with the implementation shown in FIG. 2 results from the fact that VCO 110 continuously generates signals during a transmit mode even during those periods when switch 116 is nonconductive. When VCO 110 continuously generates a signal, an AC signal is continuously transmitted through the wiring of the circuit, which tends to operate as a secondary antenna thereby transmitting RF signals when no signal is supposed to be transmitted. To better understand this phenomenon, the construction of VCO 110 is described in detail below.

FIG. 18 shows the general construction of VCO 110 as used in the circuits shown in FIGS. 2 to 4. As shown, VCO 110 includes an oscillator 125 that generates a periodic signal having a frequency that varies in proportion to a voltage applied to terminal 126. Terminal 126 is coupled to oscillator 125 via a resistor 127. The output of oscillator 125 is applied to the base of a transistor 129. As an oscillating output signal from oscillator 125 is applied to the base of transistor 129, transistor 129 generates an oscillating current Ios (see FIG. 19) that in turn is passed through antenna 2 and the other components 130 of the trainable transmitter (see FIG. 19). The current draw of a signal generator 10 including such a VCO 110 is in the relatively high range of 110 to 115 mA. As a result of the relatively high oscillating frequency Ios passing through the wires of signal generator 10 and other portions of the trainable transmitter, a residual radiation is generated by VCO 110 during all periods in which it is operating. Consequently, a trainable transmitter constructed utilizing the signal generator shown in FIG. 2 and having a VCO 110 constructed as shown in FIG. 18 exhibits only 3 to 10 dB pulses, because VCO 110 continuously oscillates during such transmission periods. To overcome this problem, the implementation described in U.S. Pat. No. 5,479,155 and shown in FIG. 3 was adopted.

As shown in FIG. 3, signal generator 10' similarly includes a VCO 110, divide-by-128 circuit 111, divide-by-N circuit 112, reference oscillator 113, and a mixer 114. These components essentially operate in the same manner as described above. The difference in the two signal generators pertains to the manner in which the generated signal is modulated. To overcome the above-mentioned problem with the implementation shown in FIG. 2, a switching transistor 119 is provided that turns VCO 110 on and off in response to the data signal supplied by microprocessor 16. In this manner, VCO 110 does not generate a signal during the times in which it is not supposed to. However, because the voltage control signal supplied to VCO 110 is dependent upon the feedback of the frequency generated by VCO 110, a loop filter 117 and sample-and-hold circuit 118 are required to prevent the applied voltage from changing as VCO 110 is selectively turned on and off in a transmit mode. If the applied voltage were to change as VCO 110 is turned on and off, the frequency of VCO 110 would become sporadic. The provision of such a sample-and-hold circuit, however, creates other problems, since the capacitor used in the sample-and-hold circuit is relatively large and cannot be incorporated in an integrated circuit. Thus, to overcome that problem, the configuration described in U.S. Pat. No. 5,686,903 and shown in FIG. 4 was adopted.

The configuration shown in FIG. 4 for signal generator 10" is similar to the prior configuration in that VCO 110 is selectively enabled and disabled in response to the data signal supplied from microprocessor 16. Signal generator 10" differs from the other signal generator implementations, however, in that a unique phase-locked loop circuit 121 is provided to receive the frequency control signal from microprocessor 16 and to generate the appropriate voltage level to apply to the voltage control input terminal of VCO 110. Phase-locked loop circuit 121 performs this task by comparing the frequency generated by VCO 110 with a fixed reference frequency generated by reference oscillator 113. To prevent phase-locked loop circuit 121 from responding erratically when VCO 110 is disabled, the data signal supplied to VCO 110 is also supplied to phase-locked loop circuit 121 so as to prevent the phase-locked loop circuit from changing the voltage level applied to VCO 110 during such periods that VCO 110 is disabled. A problem with the configuration shown in FIG. 4 is that phase-locked loop circuit 121 must be custom designed to be responsive to the data signal and therefore is more complicated and expensive to produce.

SUMMARY OF THE INVENTION

Accordingly, it is an aspect of the present invention to solve the above problems by providing a trainable transmitter that requires fewer parts and is therefore less expensive. An additional aspect of the present invention is to provide a trainable transmitter that has a well partitioned design using bipolar components for the RF circuitry and CMOS components for the microprocessor, thereby utilizing each technology where it is best suited. Yet another aspect of the present invention is to provide a trainable transmitter that operates at current levels of 40 mA or less. Still another aspect of the present invention is to provide a trainable transmitter in which the VCO continuously generates a signal during a transmit mode without causing any residual radiation of significant levels in the frequency bands of interest.

To achieve these and other aspects and advantages, the trainable transmitter of the present invention comprises a receiver for receiving a signal from an original transmitter, a signal generator for generating a signal having a frequency related to a frequency control signal supplied to a frequency control terminal of the signal generator, and a processor directly coupled to the frequency control terminal of the signal generator for supplying the frequency control signal and coupled to an output terminal of the signal generator for monitoring the frequency of the signal output from the signal generator.

The above aspects and advantages may alternatively or additionally be achieved by a trainable transmitter constructed in accordance with a different embodiment in which a transmitter for transmitting an RF signal to a receiver that is responsive to an amplitude-modulated RF signal having a predetermined data code and a carrier frequency within a predetermined frequency band to which the receiver is tuned. The transmitter comprises a signal generator for generating an RF carrier signal having a carrier frequency that is outside the predetermined frequency band of the receiver and a frequency-dividing circuit coupled to an output of the signal generator. When enabled, the frequency-dividing circuit divides the frequency of the RF carrier signal to output a signal having a carrier frequency falling within the predetermined frequency band of the receiver. When disabled, the frequency-dividing circuit passes the RF carrier signal received from the signal generator without dividing its frequency. The transmitter further comprises a control circuit for generating a modulation signal representing the predetermined data code and supplying the modulation signal to the frequency-dividing circuit to selectively enable and disable the frequency-dividing circuit in response to the modulation signal, such that the frequency-dividing circuit generates a modulated RF signal. The transmitter also comprises an antenna coupled to receive the modulated RF signal output from the frequency-dividing circuit and to transmit the modulated RF signal to the receiver.

The above aspects and advantages may alternatively or additionally be achieved by a trainable transmitter constructed in accordance with yet another embodiment in which the trainable transmitter comprises a receiver for receiving a signal from a transmitter, a signal generator including a differential VCO for generating a signal having a frequency related to a frequency control signal supplied to a frequency control terminal of the signal generator, and a control circuit coupled to the receiver and to the frequency control terminal of the signal generator for supplying the frequency control signal so as to control the frequency of the signal generated by the differential VCO.

The above aspects and advantages may further be achieved by a trainable transmitter constructed in accordance with another embodiment of the present invention whereby the trainable transmitter comprises a receiver for receiving a signal from a transmitter, a signal generator for generating an unmodulated signal having a frequency related to a frequency control signal supplied to a frequency control terminal of the signal generator, and a control circuit coupled to the receiver and to the frequency control terminal of the signal generator for supplying the frequency control signal. The control circuit operates in a training mode and a transmission mode. In the training mode, the control circuit controls the signal generator and monitors a connection to the receiver so as to learn characteristics of the received signal, including its carrier frequency. During the transmission mode, the control circuit controls the signal generator to generate an unmodulated signal having the learned carrier frequency while modulating the generated signal after it is output from the signal generator, such that the trainable transmitter transmits a modulated signal during the transmission mode having a signal pulse variation greater than 10 dB.

As described further below, the trainable transmitter of the present invention may be implemented using any one of five different embodiments.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 15 is an electrical circuit diagram in schematic form illustrating a differential VCO constructed in accordance with the present invention;

FIGS. 16A to 16C are diagrams showing different currents flowing through the differential VCO shown in FIG. 15;

FIG. 18 is an electrical circuit diagram illustrating a conventional VCO used in the conventional signal generators shown in FIGS. 2 to 4; and FIG. 19 is a diagram illustrating the current flowing through transistor 128 of the conventional VCO shown in FIG. 18.

DETAILED DESCRIPTION OF THE PREFERRED EMBODIMENTS

Figure 6:
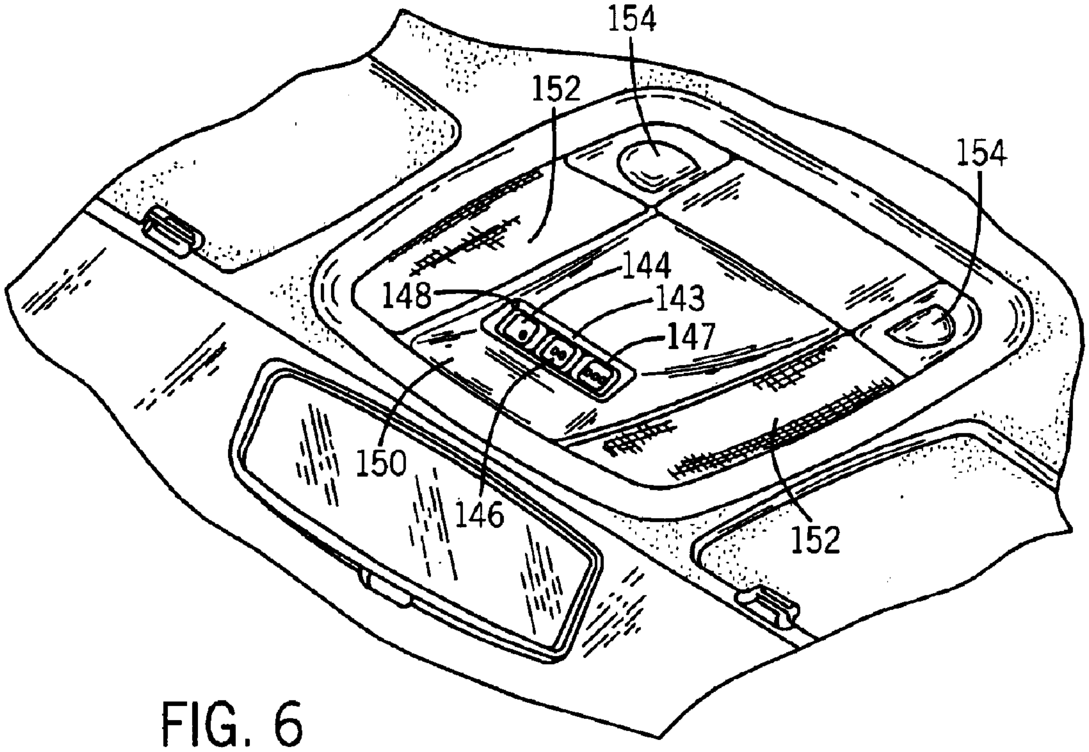
FIG. 6 is a fragmentary perspective view of a vehicle interior having an overhead console for housing the trainable transmitter of the present invention.
Figure 5:
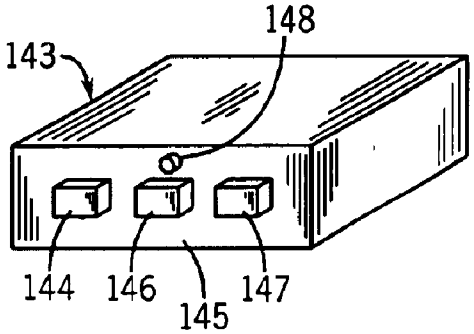
FIG. 5 is a perspective view of a trainable transmitter of the present invention.

FIG. 5 shows a trainable transmitter 143 of the present invention. Trainable transmitter 143 includes three pushbutton switches 144, 146, and 147; an LED 148; and an electrical circuit board and associated circuits (FIG. 9, 11, 13, 14, or 17) that may be mounted in a housing 145. As explained in greater detail below, switches 144, 146, and 147 may each be associated with a separate garage door or other device to be controlled. Trainable transmitter housing 145 is preferably of appropriate dimensions for mounting within a vehicle accessory, such as an overhead console 150 as shown in FIG. 6. In the configuration shown in FIG. 6, trainable transmitter 143 includes electrical conductors coupled to the vehicle's electrical system for receiving power from the vehicle's battery. Overhead console 150 includes other accessories, such as map reading lamps 152 controlled by switches 154. It may also include an electronic compass and display and/or trip computer (not shown).

Figure 7:
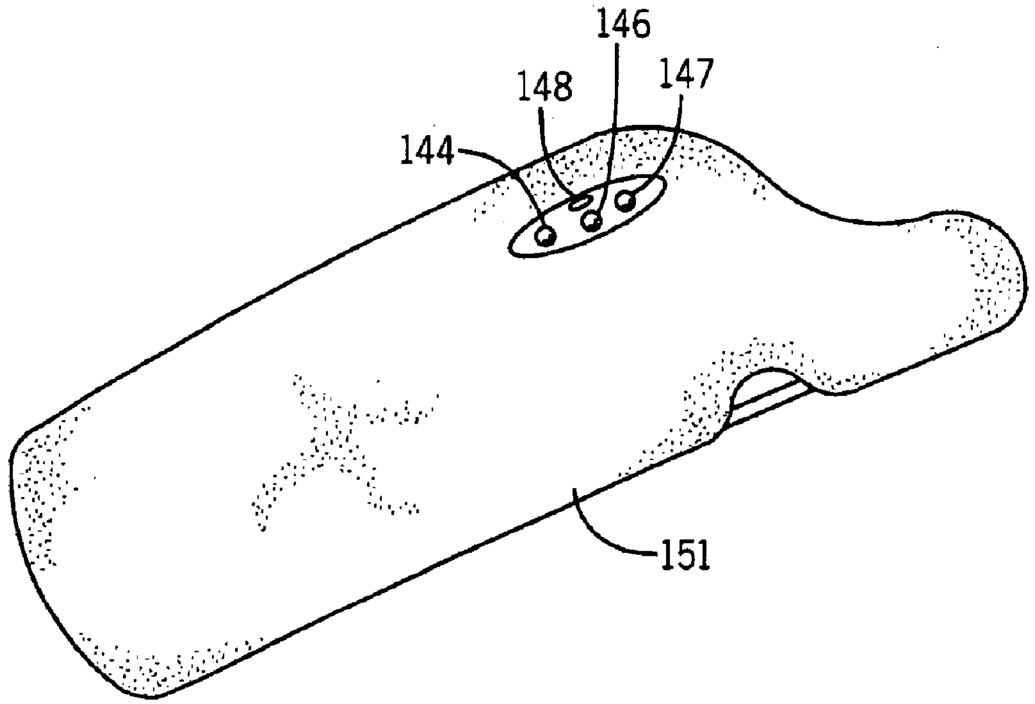
FIG. 7 is a perspective view of a visor incorporating the trainable transmitter of the present invention.
Figure 8:
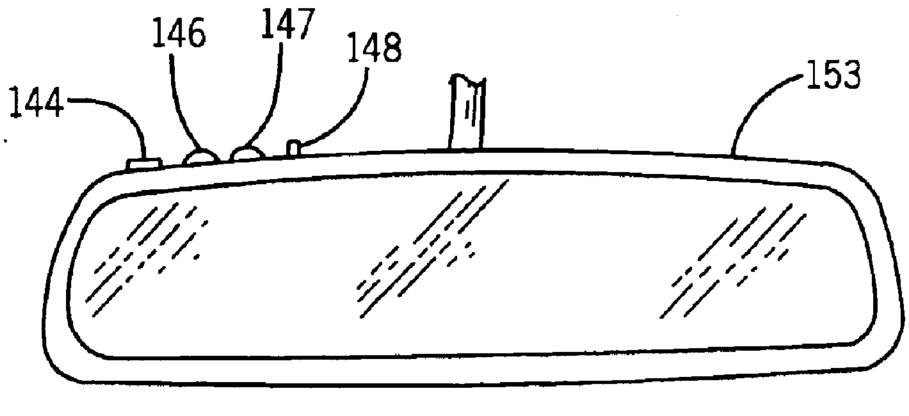
FIG. 8 is a perspective view of a mirror assembly incorporating the trainable transmitter of the present invention.

Trainable transmitter 143 may alternatively be permanently incorporated in a vehicle accessory, such as a visor 151 (FIG. 7) or a rearview mirror assembly 153 (FIG. 8). Although trainable transmitter 143 has been shown as incorporated in a visor and mirror assembly and removably located in an overhead console compartment, trainable transmitter 143 could be permanently or removably located in the vehicle's instrument panel or any other suitable location within the vehicle's interior.

First Embodiment

Figure 1:
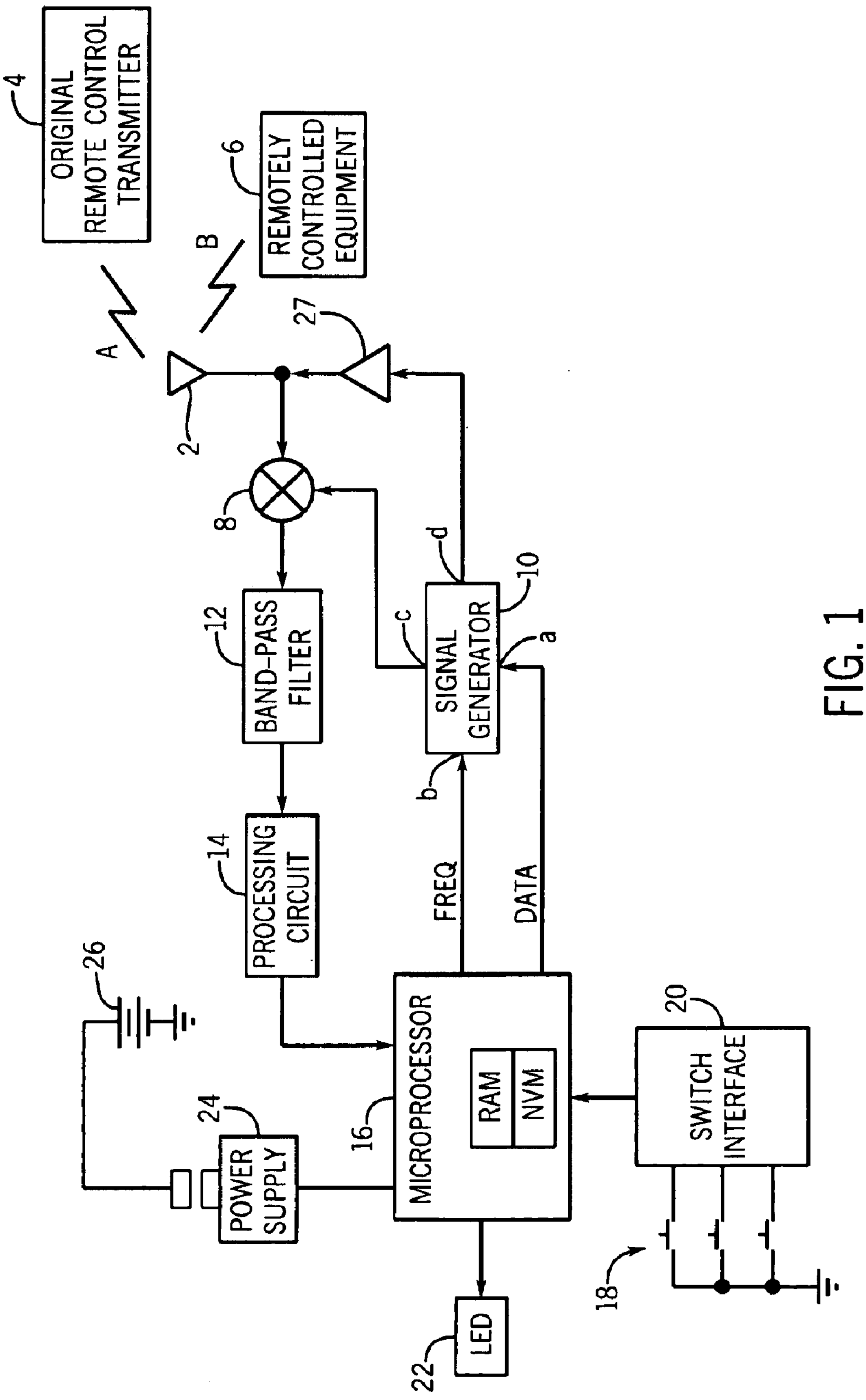
FIG. 1 is an electrical diagram in block form illustrating a trainable RF transmitter.
Figure 9:
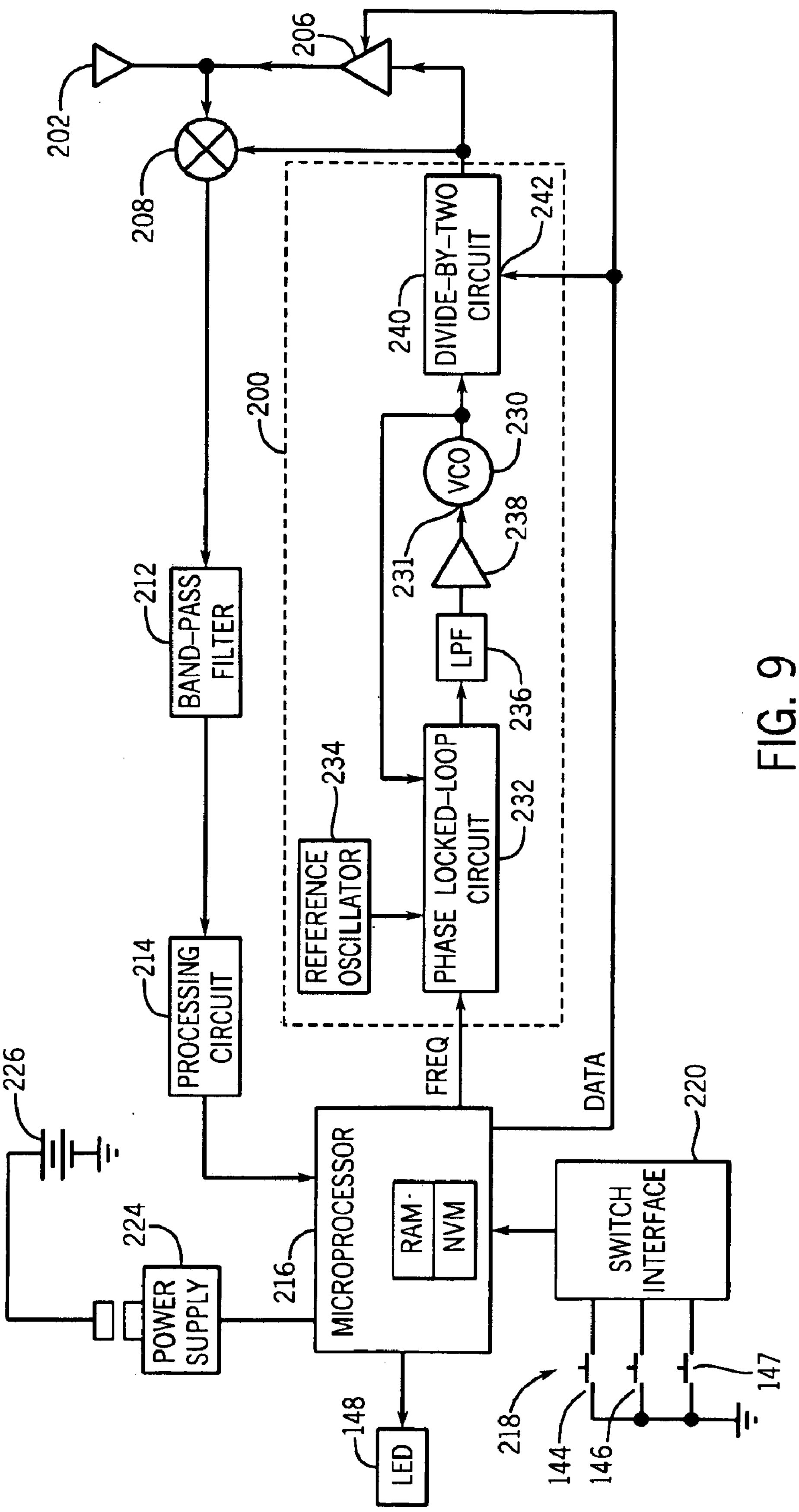
FIG. 9 is an electrical circuit diagram in block form illustrating a trainable transmitter constructed in accordance with a first embodiment of the present invention.

The electrical components of a trainable transmitter constructed in accordance with a first embodiment of the present invention are shown in FIG. 9. A trainable transmitter according to the first embodiment includes many of the elements included in the trainable transmitter discussed above with reference to FIG. 1. Specifically, the trainable transmitter according to the first embodiment includes a signal generator 200, an antenna 202, a transmit amplifier 206, a mixer 208, a bandpass filter 212, a processing circuit 214, a microprocessor 216, a plurality of switches 218, a switch interface circuit 220, an LED 148, and a power supply circuit 224 for coupling to a battery 226 of the vehicle in which the trainable transmitter may be installed. As described below, the trainable transmitter according to this first embodiment of the present invention uniquely differs from the trainable transmitters discussed above with reference to FIGS. 1 to 4 in the specific construction of the signal generator.

As shown in FIG. 9, signal generator 200 includes a VCO 230, which preferably generates carrier signals having a carrier frequency in the range of 440 MHz to 880 MHz. The specific frequency of the carrier signal generated by VCO 230 is selected by microprocessor 216, which generates a frequency control signal that is input to a conventional phase-locked loop circuit 232 in signal generator 200. Phase-locked loop circuit 232 may be a conventional circuit that is capable of receiving a digital control signal identifying a specified frequency so as to compare the phases of signals output from VCO 230 and a reference oscillator 234, and output an analog voltage signal that has a voltage level that varies based upon the phase comparison. The output of phase-locked loop circuit 232 is filtered by a low-pass filter 236 and passed through a buffer 238 to the frequency control input terminal 231 of VCO 230. VCO 230 responds to the voltage level of the analog voltage signal applied to input terminal 231 by varying the carrier frequency of the signal it generates.

Figure 2:
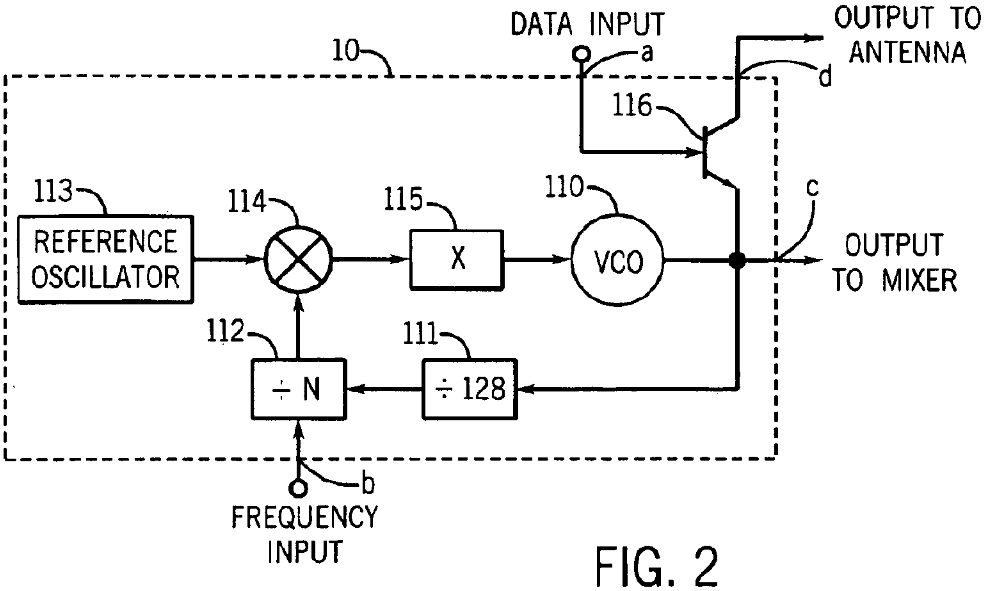
FIG. 2 is an electrical circuit diagram in block and schematic form illustrating a first conventional signal generator for use in the trainable transmitter shown in FIG. 1.
Figure 3:
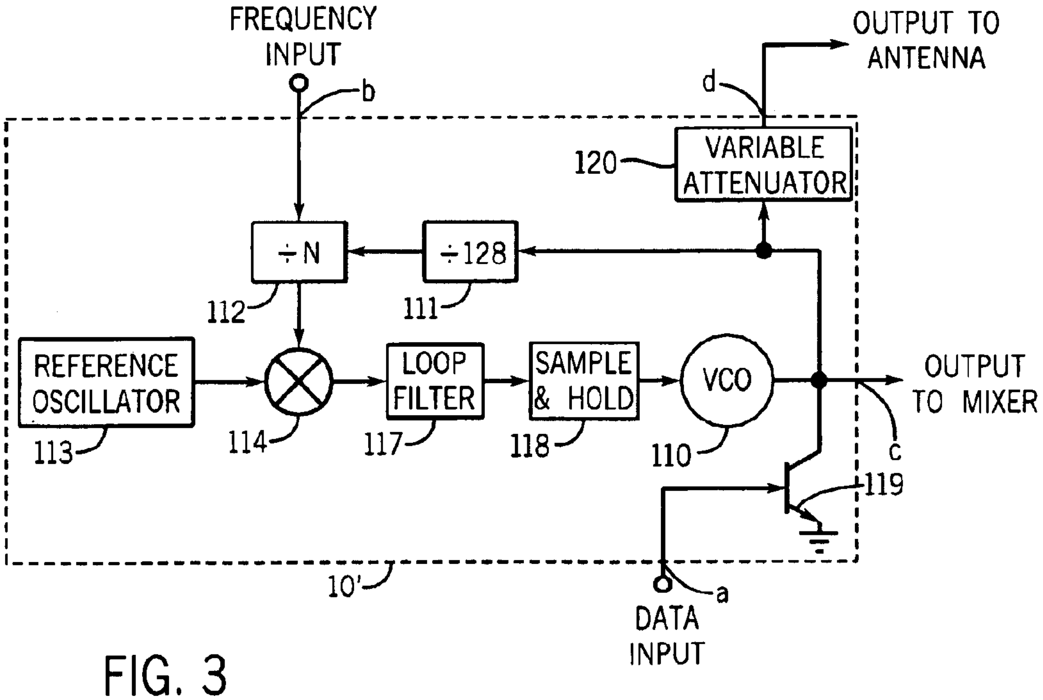
FIG. 3 is an electrical circuit diagram in block and schematic form illustrating a second conventional signal generator for use in the trainable transmitter shown in FIG. 1.
Figure 4:
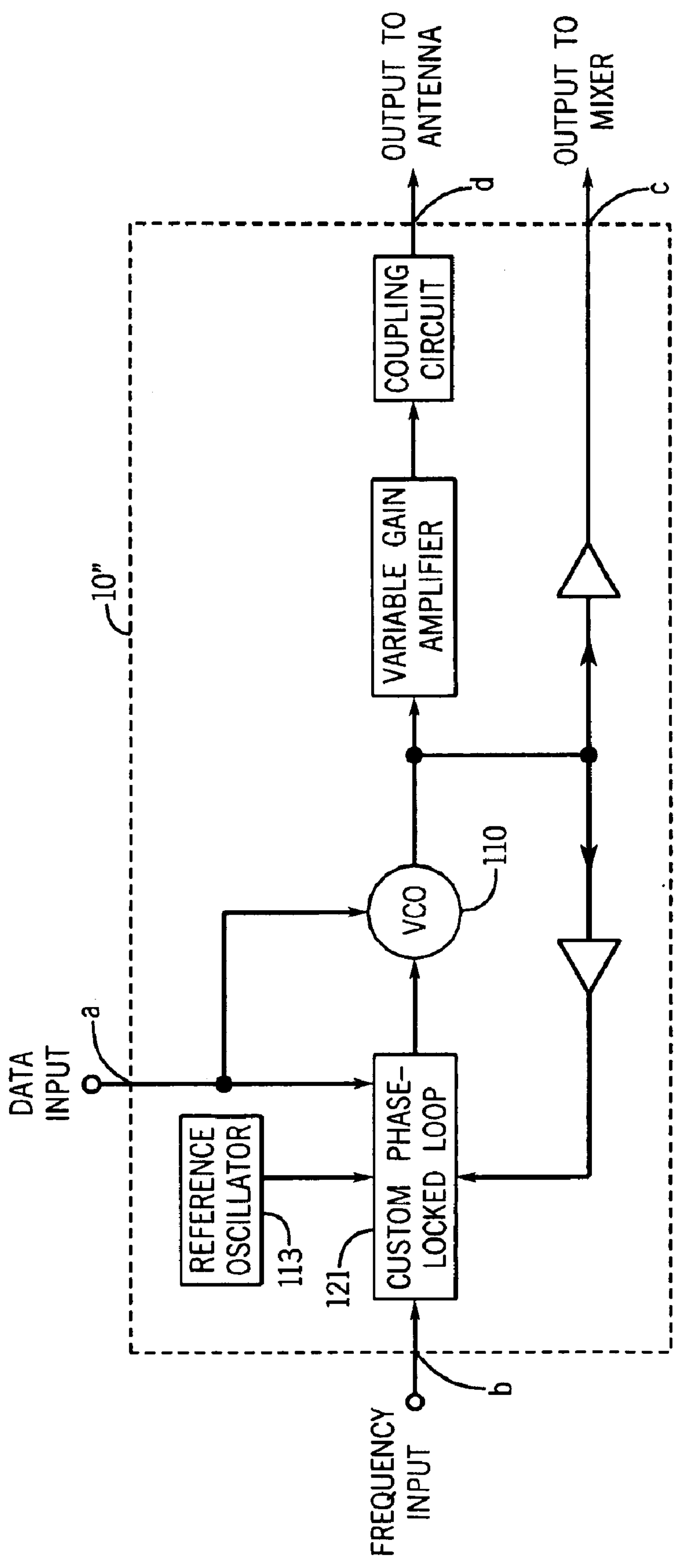
FIG. 4 is an electrical circuit diagram in block and schematic form illustrating a second conventional signal generator for use in the trainable transmitter shown in FIG. 1.

Like the signal generating circuit shown in FIG. 2, signal generator 200 is constructed such that VCO 230 continuously generates a carrier signal during both the training and transmission modes. By constructing signal generator 200 to operate in this continuous manner, phase-locked loop circuit 232 need not be customized so as to be selectively enabled and disabled during the transmission mode by the amplitude shift key (ASK) data output from microprocessor 216, which is used to modulate the generated carrier signal. Because phase-locked loop circuit 232 may be a conventional off-the-shelf circuit, the cost of producing the trainable transmitter shown in FIG. 9 may be significantly reduced from the prior version that utilizes the signal generator 10" shown in FIG. 4. Furthermore, the signal generator shown in FIG. 4 requires current levels in the range of 110 to 115 mA, while standard phase-locked loop circuits are available, however, that are optimized for low current applications that have significantly lower current level requirements. Such standard phase-locked loop circuits operate with currents as low as 20 mA and even as low as 2 mA, such as the 0.8 or 1.06 MHz phase-locked loop circuit, part No. LMX2316 available from National Semiconductor.

To further reduce any adverse effects of any residual radiation generated by signal generator 200 during those periods in the signal transmission mode between transmitted pulses, VCO 230 is constructed to generate RF carrier signals having carrier frequencies outside the frequency band to which the intended receivers of the remotely controlled equipment are tuned. Specifically, VCO 230 generates signals in a first frequency band of 440 MHz to 880 MHz, whereas garage door opener receivers are narrowly tuned to frequencies in a second band of 220 MHz to 440 MHz. Thus, any residual radiation that is generated by signal generator 200 is in a frequency range outside the frequency bands of the intended receivers. Therefore, the residual radiation will not interfere with the reception by those receivers of a signal transmitted within the frequency bands to which they are tuned.

In order for the signal generator 200 to generate a modulated RF signal to which a receiver having a frequency reception band in the typical 220 MHz to 440 MHz range will respond, signal generator 200 includes a divide-by-2 circuit 240 that is coupled between the output of VCO 230 and transmit amplifier 206 and mixer 208. When divide-by-2 circuit 240 is enabled and VCO 230 generates a carrier signal having a frequency in the range of 440 MHz to 880 MHz, signal generator 200 will output a signal having a carrier frequency in the range of 220 MHz to 440 MHz.

Figure 10A:
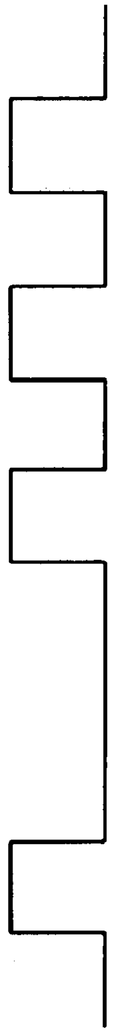
FIGS. 10A and 10B are signal diagrams showing a signal as generated by the signal generator according to the first embodiment of the present invention, and the same signal as detected by the receiver of a remotely controlled device.
Figure 10B:

During a transmission mode, the carrier signal generated by VCO 230 is modulated by applying the data code signal output from microprocessor 216 to an enable/disable input port 242 of divide-by-2 circuit 240. In this manner, the divide-by-2 circuit is selectively enabled and disabled in response to the data signal supplied from microprocessor 216. The modulated signal output from divide-by-2 circuit 240 is a frequency-modulated signal similar to that shown in FIG. 10A. Because the receiving bandwidth of most receivers in garage door openers and other remotely operated devices are relatively narrow and fall within the 220 MHz to 440 MHz frequency range, the frequency-modulated signal generated by signal generator 200 would appear to the receiver circuitry as the signal shown in FIG. 10B, whereby the frequency component that is twice that of the tuned frequency is effectively filtered from the signal. Thus, the receiver will see a signal that is effectively amplitude modulated with the data code to which it is to respond and which has a carrier frequency within the frequency band to which the receiver is tuned.

If it is desired to only transmit an amplitude-modulated signal from antenna 202, the data signal from microprocessor 216 may additionally be applied to an enable/disable terminal of transmit amplifier 206, such that the transmit amplifier is disabled during those periods in which the divide-by-2 circuit 240 is disabled, and would otherwise transmit a signal at a frequency twice that to which the receiver is tuned.

The first embodiment may also be constructed using a tunable antenna, such as that disclosed in U.S. Pat. No. 5,699,054. Because such a tunable antenna can be tuned to a relatively narrow bandwidth, the antenna can be tuned to further suppress the transmission of the generated signal when it has a frequency twice that to which the receiver is tuned.

While the first embodiment is described above as utilizing a VCO 230 that generates signals having frequencies twice that of which an intended receiver may respond, any VCO may be utilized that generates signals having frequencies that are any multiple of the intended transmission frequency so long as a frequency divider circuit is utilized that divides the frequency of the signal generated by the VCO by that multiple.

Because the signal generator of the first embodiment is constructed to respond to the same frequency control signals and data signals as supplied by a microprocessor of the prior trainable transmitters, microprocessor 216 may be programmed to function in the same manner as those of the prior trainable transmitters described in the U.S. patents identified above.

Second Embodiment

Figure 11:
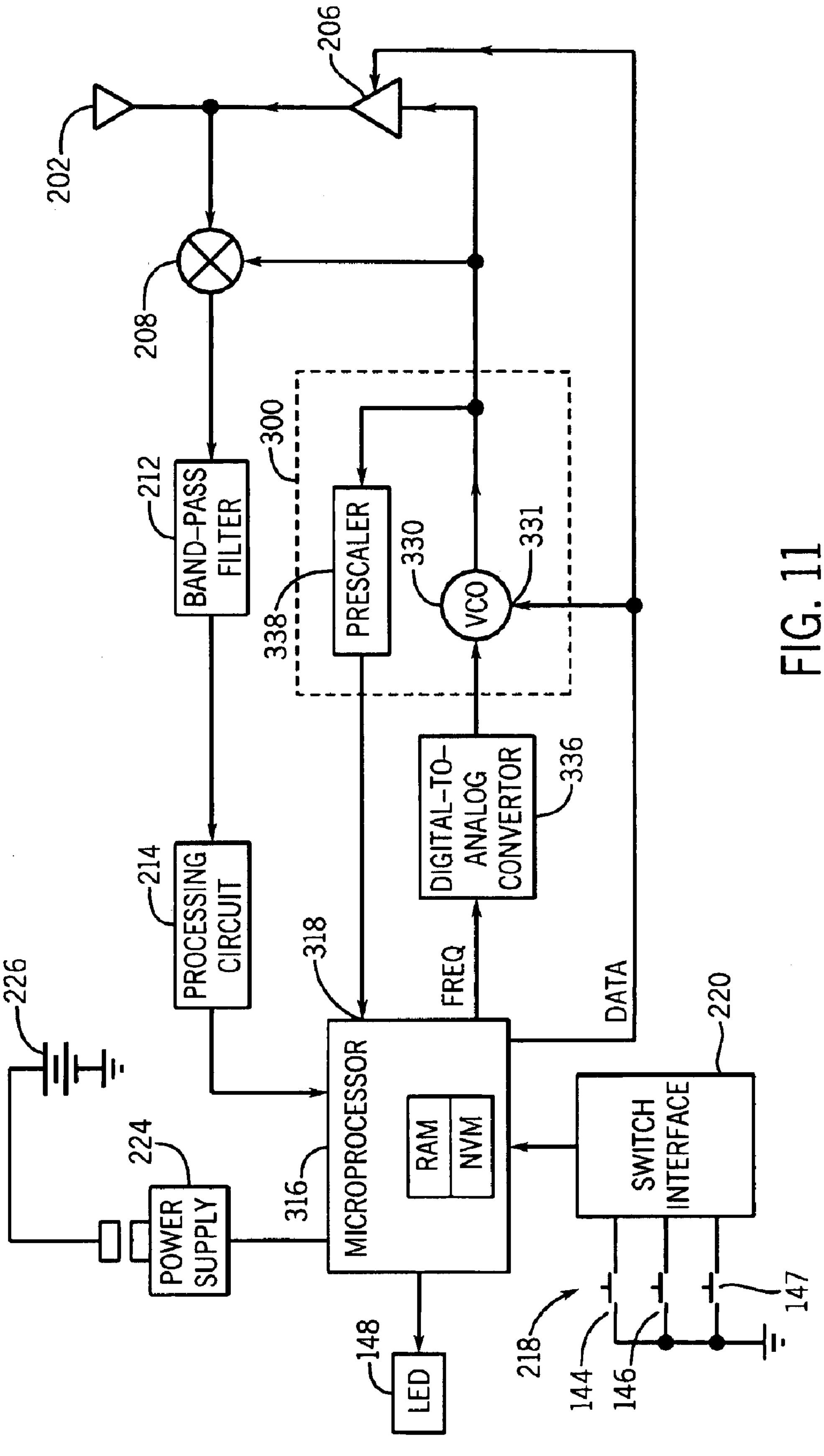
FIG. 11 is an electrical circuit diagram in block form illustrating a trainable transmitter constructed in accordance with a second embodiment of the present invention.

FIG. 11 shows a trainable transmitter constructed in accordance with a second embodiment of the present invention. The trainable transmitter of the second embodiment is similar to that of the first embodiment except for the construction of signal generator 300 and the programming and configuration of microprocessor 316. As described below, signal generator 300 does not include any type of phase-locked loop circuit at all, but rather the frequency synthesis is performed by microprocessor 316.

To select and adjust the frequency of the signal generated by VCO 330, microprocessor 316 and a digital-to-analog converter 336 provide an adjusting analog voltage to the VCO. This may be done by storing a voltage on a capacitor of digital-to-analog converter 336 and then allowing the microprocessor to adjust the stored voltage up and down by small selectable increments. The analog signal output from digital-to-analog converter 336 is applied to the frequency control terminal 332 of VCO 330. VCO 330 is preferably configured to generate signals having carrier frequencies anywhere within the 220 MHz to 440 MHz frequency band.

Because the same analog voltage for the frequency control signal will not necessarily always result in a signal generated by VCO 330 having the same frequency due to variations in operating temperature, it is desirable to have microprocessor 316 monitor the frequency of the signal generated by VCO 330 so as to make adjustments to the frequency control signal and thereby adjust the frequency of the generated signal when necessary. To enable microprocessor 316 to monitor the frequency of the signal output from VCO 330, a feedback signal is passed through a prescaler circuit 338 to an input port 318 of microprocessor 316. Prescaler 338 may be a frequency-dividing circuit as described in more detail below.

There are basically two ways for microprocessor 316 to measure the frequency of the signal received at its input terminal 318. The first method is to measure the time period of a cycle of the signal applied to terminal 318. To increase the accuracy of such a measurement, a number of such measurements may be taken and then averaged.

A second and more preferred technique for measuring frequency is to count the number of cycles in a predetermined time period, hereinafter referred to as "the gate time." The frequency is then determined by dividing the number of counts by the gate time. Because the number of counts is an integer, the accuracy of the frequency measurement is inversely proportional to the gate time (GATE). Because it is advantageous to first divide the frequency of the signal generated by VCO 330 using prescaler circuit 338, microprocessor 316 must multiply the frequency of the signal applied to terminal 318 by the value (PRESCALE) at which prescaler circuit 338 divides the frequency of the signal output from VCO 330. Thus, the accuracy of the frequency measurement is equal to 1/(GATE PRESCALE). While it would appear that to obtain the most accurate measurement one would wish to increase the gate time as long as possible, longer gate times decrease the responsiveness of microprocessor 316. Therefore, tolerances are established for the accuracy of the measurement, as needed for the trainable transmitter to effectively assimilate and reproduce a learned signal.

During the training mode whereby the trainable transmitter is receiving a signal and signal generator 300 is required to generate a reference signal to apply to mixer 208, the frequency tolerance of the system ±500 kHz. To maintain the output signal of VCO 330 within ±500 kHz of the desired frequency, the frequency of the output signal should be measured within ±50 kHz or 100 kHz. Knowing that the frequency measurement accuracy is equal to 1/(GATE PRESCALE), the gate time for obtaining measurement within 100 kHz is 320 μsec when the prescaler is a divideby-32 circuit (i.e., PRESCALE=32). Thus, microprocessor 316 is programmed to count the number of cycles of the signal applied to input terminal 318 occurring within a 320 μsec period in order to determine the frequency during a training mode. Microprocessor 316 may monitor the frequency by continuously taking measurements of the frequency and thereby adjust the digital value of the frequency control signal to adjust the analog voltage applied to the frequency control terminal 332 of VCO 330, which in turn adjusts the frequency of the signal output from signal generator 300.

According to the embodiment shown in FIG. 11, a modulated signal is obtained by applying the data code to an enable/disable terminal 334 of VCO 330. The data code may, for example, have a modulation frequency of 25 kHz. As a result of the modulation, which occurs during a transmit mode, microprocessor 316 cannot simply count the number of cycles occurring in a predetermined gate time of, for example, 320 μsec. For a 25 kHz data signal that is at a logic high state 50 percent of the time, the VCO may be turned continuously on for as little as a 20 μsec period. A 20 μsec gate time only provides a 1.5 MHz accuracy. Therefore, given the embodiment illustrated in FIG. 11, a different frequency measurement technique must be used to measure and monitor frequency during a signal transmission mode. Because microprocessor 316 will know from the data signal when VCO 330 will be transmitting and when it will not, microprocessor 316 may limit its measurements to those periods of time in which VCO 330 is transmitting. Thus, for example, microprocessor 316 may limit its measurement to the 20 μsec gate times during which VCO 330 may be transmitting.

Figure 12A:
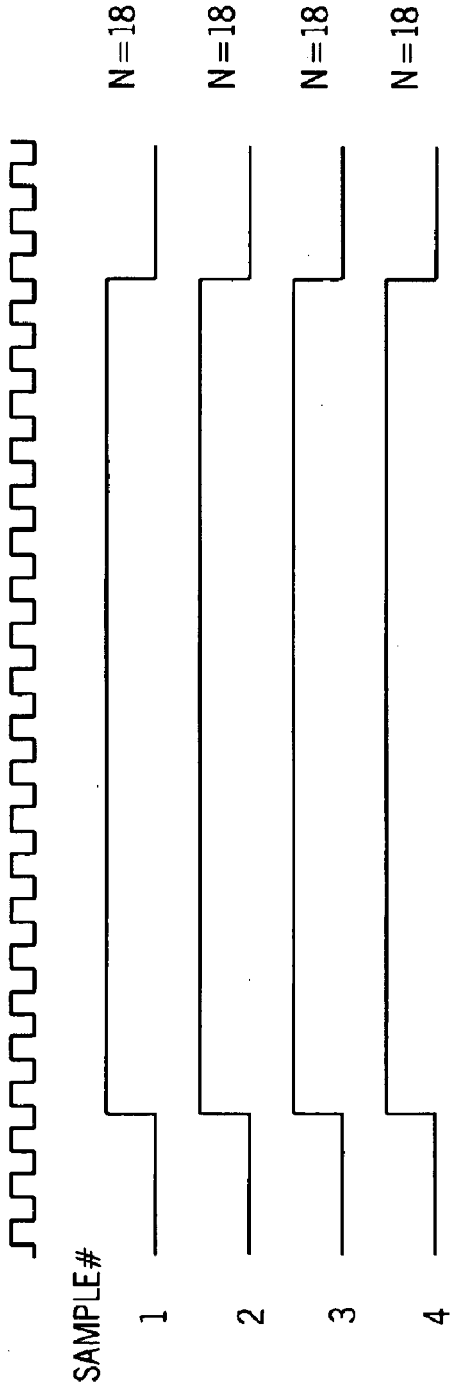
FIG. 12 is a timing diagram illustrating frequency measurement principles utilized in the present invention.
Figure 12B:
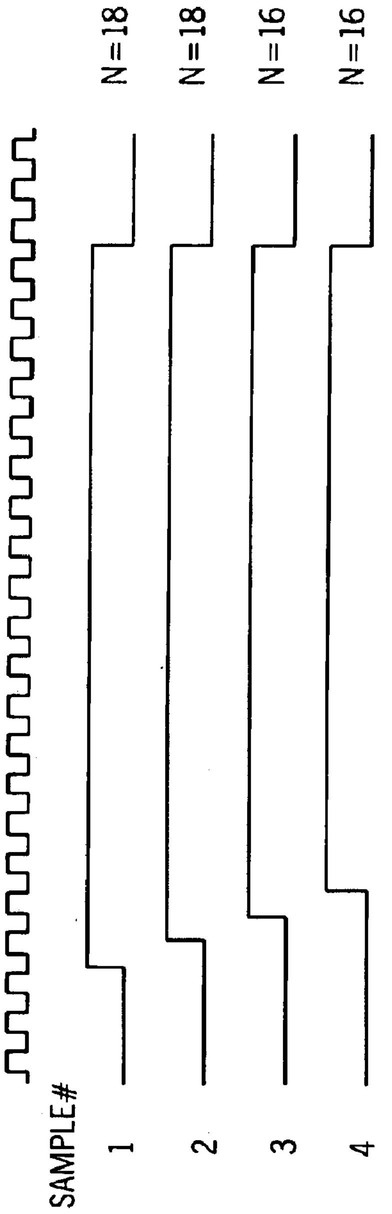

To increase the accuracy of its frequency measurement, microprocessor 316 may accumulate the counted cycles for a plurality of samples taken over a plurality of such gate times. A problem arises, however, due to the accuracy of the measurement technique that any inaccuracies of measurement occurring during any one 20 μsec sample will also accumulate. For example, as shown in FIG. 12A, when the number of cycles occurring within a gate time are not exactly equal to an integer value, the resulting error is multiplied by the number of samples accumulated for the measurement. A solution to this problem is to slightly vary the gate time for each sample in a small but consistent way. Thus, as shown in FIG. 12B, the number of cycles counted during each gate time will vary thereby eliminating the accumulation of any errors in the measurement occurring during any one gate time sample. In practice, the gate times are staggered by one instruction cycle of the microprocessor. The stagger is equal to 4 divided by the CPU oscillator frequency.

Figure 12C:
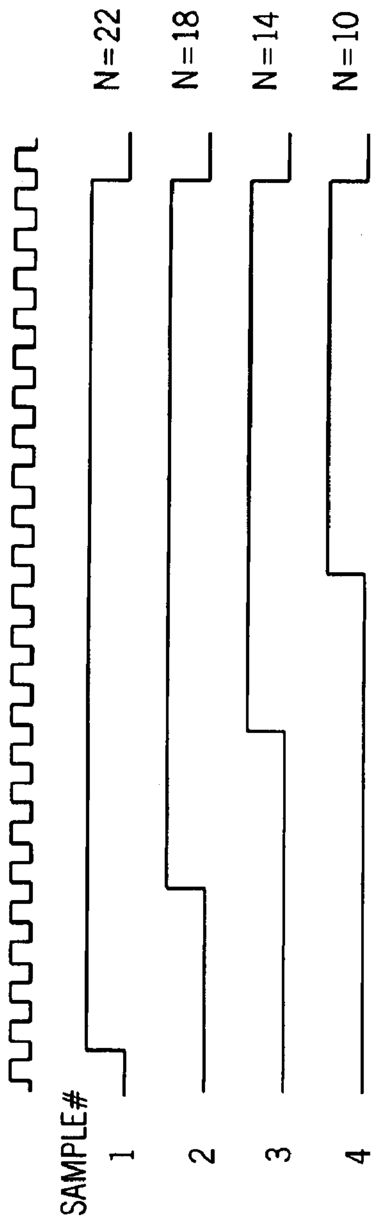

By staggering the gate times as discussed above, frequencies may be measured within the frequency tolerances for the device, except in situations in which the frequency of the signal output from VCO 330 has a harmonic relationship to the amount of stagger used. For example, if a 10 MHz signal is applied to terminal 318 and the CPU is running at 10 MHz, the sampling points will line up with the measured frequency thereby causing an accumulation of error of each sample. FIG. 12C illustrates the nature of the problem. The 10 MHz signal has a cycle time of 100 μsec. A microprocessor operating at 10 MHz has an instruction cycle, one instruction per 400 μsec. Thus, each gate is staggered by 400 μsec. Assuming then that the microprocessor measures 22 counts during the first gate, it would then measure 18 counts during the second gate, 14 counts during the third gate, and 10 counts during the fourth gate. Thus, the accumulated counts for these three gates would be 64. If, however, the signal received at input terminal 318 is just under 10 MHz, one less cycle would be counted in each of the three gate periods thereby resulting in an accumulated count of 60. Such a change in count values may not accurately reflect the actual difference in the frequencies applied at input terminal 318. Because there are certain frequencies within the 220 MHz to 440 MHz band that are forbidden for transmission of signals and because there are certain frequencies that are very likely candidate frequencies for garage door opener signals, a solution to the synchronization problem discussed above is to select a microprocessor having a frequency that is harmonically related to a frequency in one of the bands that are forbidden or otherwise unlikely frequencies for a garage door opener transmitter. Thus, microprocessor 316 is preferably selected to have an operating frequency of 17.100 MHz.

Third Embodiment

Figure 13:
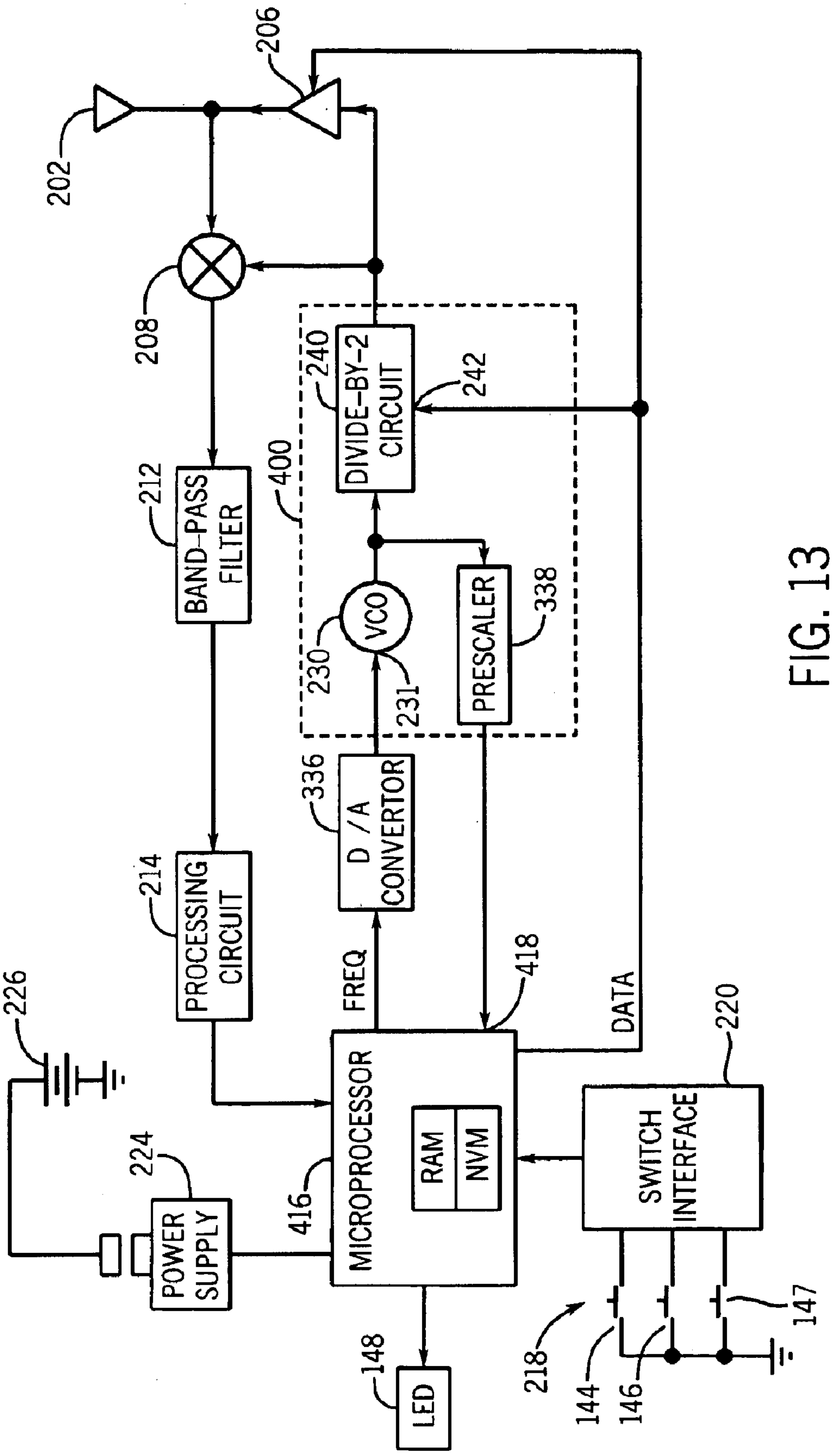
FIG. 13 is an electrical circuit diagram in block form illustrating a trainable transmitter constructed in accordance with a third embodiment of the present invention.

FIG. 13 shows a trainable transmitter constructed in accordance with a third embodiment of the present invention. The third embodiment combines aspects of the first and second embodiments. Specifically, microprocessor 416 is used to directly monitor and control the frequency of VCO 230 in a manner similar to the second embodiment. Signal generating circuit 400, however, includes a VCO 230 that operates in the 440 MHz to 880 MHz band, as well as a divide-by-2 circuit 240 that selectively divides the frequency of the signal output by VCO 230 in response to the data signal applied to an enable/disable terminal 242 of circuit 240. By combining the aspects of the first and second embodiments, the problems with the second embodiment concerning frequency measurement during a signal transmission mode may be avoided. This is because VCO 230 is intended to continuously transmit at the selected frequency during the signal transmission mode, with the modulation being performed by selectively enabling and disabling divide-by-2 circuit 240 rather than VCO 230. Thus, microprocessor 416 may measure the frequency of the signal output from VCO 230 over gate times of the same duration both during the training and signal transmission modes.

Fourth Embodiment

Figure 14:
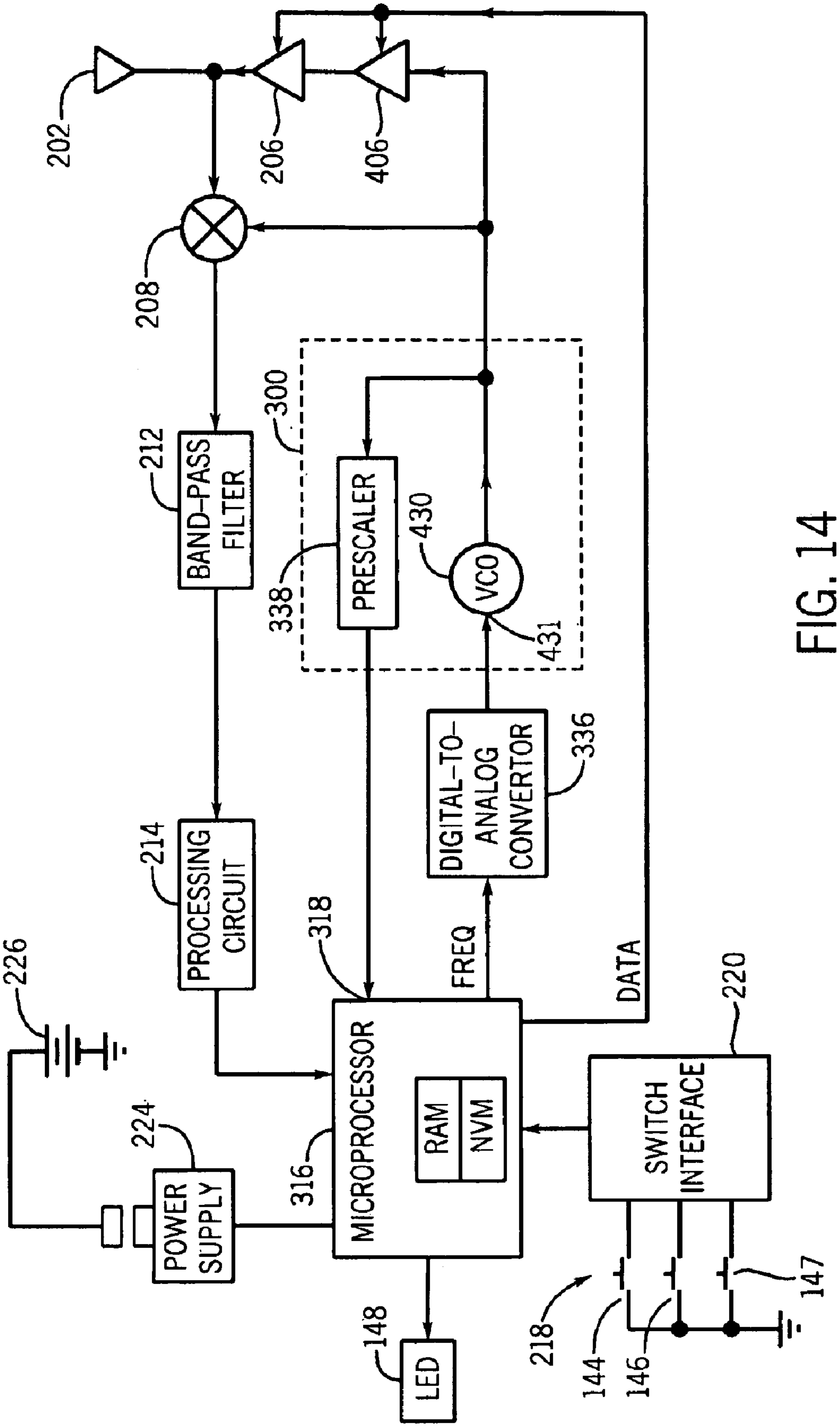
FIG. 14 is an electrical circuit diagram in block form illustrating a trainable transmitter constructed in accordance with a fourth embodiment of the present invention.

FIG. 14 shows a trainable transmitter constructed in accordance with a fourth embodiment of the present invention. The trainable transmitter shown in FIG. 14 is similar to the second embodiment shown in FIG. 11, with the exception that VCO 330 is replaced with a differential VCO 430 that is constructed as shown in FIG. 15 as described further below. Additionally, the trainable transmitter of the fourth embodiment does not turn differential VCO 430 on and off as does the trainable transmitter of the second embodiment. Instead, the amplitude-shift-key data from microprocessor 316 is used to selectively enable and disable a last stage of transmit amplifier 206 and a first automatic gain control stage 406 of the transmit amplifier. Thus, according to the fourth embodiment, the signal generated by differential VCO 430 is modulated by keeping differential VCO 430 continuously oscillating, while more effectively modulating the signal using the first and last stages of the transmit amplifier.

As shown in FIG. 15, VCO 430 is configured as a differential VCO that includes an oscillator 432 that is similar to oscillator 125 shown in the conventional VCO 110 (FIG. 18), with the exception that a central tap in the inductor is grounded in oscillator 432. Consequently, scillator 432 outputs two oscillating signals of opposite phase having a frequency corresponding to the voltage applied at terminal 431. Oscillator 432 is coupled to terminal 431 via a resistor 434. The two opposite phase signals generated by oscillator 432 are passed through coupling capacitors 442 and 440 to the bases of two differential transistors 436 and 438, respectively. The drains of transistors 436 and 438 are commonly coupled to ground through a resistor 448, while the sources of each of transistors 436 and 438 are respectively coupled to resistors 444 and 446. The opposite ends of resistors 444 and 446 are commonly coupled to a positive voltage source.

With the arrangement shown in FIG. 15, differential oscillator 430 draws a constant current Ios as illustrated in FIG. 16A, while still generating oscillating current output signals Iout and Iout, which correspond to the oscillating current I1 and I2, respectively, as illustrated in FIGS. 16B and 16C. Because currents 11 and 12 are sinusoidal and of opposite phase, the surn of currents I1 and I2 always remains constant and hence current Ios is always constant. Because current Ios remains constant, no residual radiation is generated by the wires through which Ios flows.

Because differential VCO 430 has such a low residual radiation, a trainable transmitter such as that shown in FIG. 14 may be constructed whereby the VCO is allowed to continuously oscillate during a transmit mode while the modulation is performed at the first and last stages of the transmit amplifier. A trainable transmitter so constructed can produce pulses in excess of 50 dB during the transmit mode. This represents a significant improvement over the 3 to 10 dB pulses produced by the trainable transmitter described above in FIGS. 1 and 2. Additionally, differential VCO 430 draws significantly lower levels of current thereby reducing any drain on the vehicle's battery. Another advantage to having VCO 430 continuously generate a signal during the transmit mode is that microprocessor 316 can more readily measure the frequency without resorting to the sampling techniques described above with respect to the second embodiment shown in FIG. 11.

Fifth Embodiment

Figure 17:
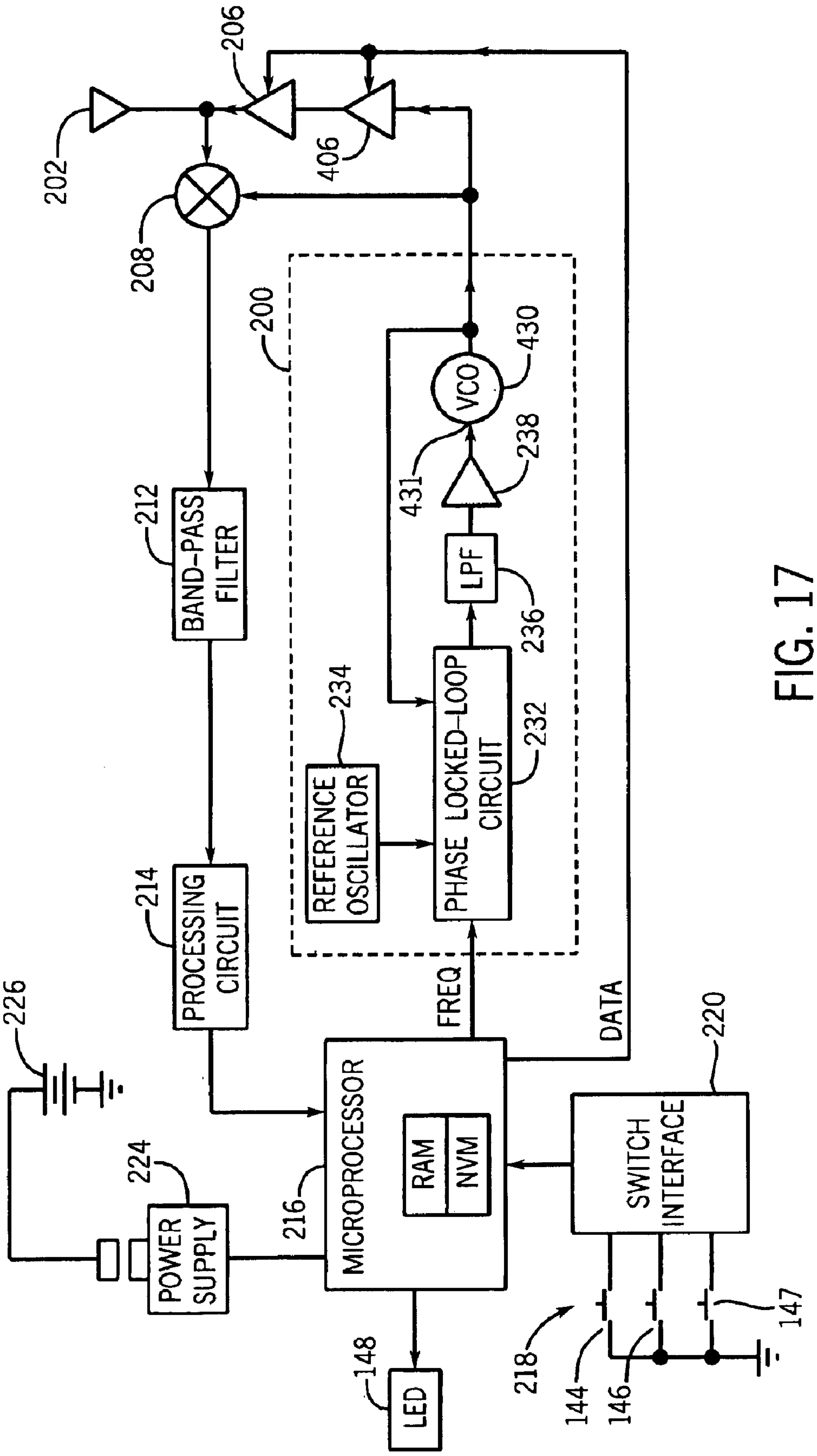
FIG. 17 is an electrical circuit diagram in block form illustrating a trainable transmitter constructed in accordance with a fifth embodiment of the present invention.

FIG. 17 shows a fifth embodiment of the trainable transmitter of the present invention. The trainable transmitter according to the fifth embodiment is similar to the first embodiment except that VCO 230 of the first embodiment is replaced with a differential VCO 430 and divide-by-two circuit 240 is eliminated from the fifth embodiment. According to the fifth embodiment, VCO 430 is configured to generate signals having wavelengths within the range to which associated receivers will respond. Due to the low residual radiation produced by VCO 430, VCO 430 is controlled to continuously generate a signal during a transmit mode, while the generated signal is modulated at the first and last stages 206 and 406 of the transmit amplifier. In this regard, the fifth embodiment is very similar to the fourth embodiment. The fifth embodiment differs, however, in that a standard phase-locked loop circuit 232 is employed to monitor and vary the frequency of the signal generated by VCO 430 in a manner similar to that described above with respect to the first embodiment of the present invention.

Although the above embodiments have been described for trainable transmitters generally used for learning signals received from garage door opener transmitters and subsequently transmitting the learned signals, it will be appreciated that the trainable transmitters may also be programmed and used for receipt of other signals, such as remote keyless entry (RKE) signals. Further, the trainable transmitters may be connected to a vehicle bus for communicating with other vehicle accessories in response to such received signals. Moreover, other accessories may then instruct the trainable transmitter to transmit a particular signal. Additionally, the trainable transmitter of the present invention may be used to learn and retransmit codes in accordance with a rolling code algorithm as described in U.S. Pat. No. 5,661,804. Further, the trainable transmitter of the present invention may be used to receive signals from various vehicle parameter sensors, such as tire pressure sensors as disclosed in U.S. Pat. No. 5,661,651.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A trainable transmitter comprising:

a receiver for receiving a signal from a transmitter;

a signal generator for generating a signal having a frequency related to a frequency control signal supplied to a frequency control terminal of said signal generator; and a processor directly coupled to the frequency control terminal of said signal generator for supplying the frequency control signal and directly coupled to an output terminal of said signal generator for monitoring the frequency of the signal output from said signal generator;

wherein said processor monitors the frequency of the signal output from said signal generator by determining when the level of the signal exceeds a threshold and counting the number of times the signal level exceeds the threshold in each of a plurality of predetermined time periods wherein the predetermined time periods are of different durations.

2. The trainable transmitter as defined in claim 1, wherein said processor includes a microprocessor and a digital-to-analog converter coupled between said microprocessor and the frequency control terminal of said signal generator for converting a digital frequency control signal output from said microprocessor into an analog voltage signal.

3. The trainable transmitter as defined in claim 2, wherein said processor further includes a frequency divider circuit coupled between the output terminal of said signal generator and an input port of said microprocessor for dividing the frequency of the signal output from said signal generator before the output signal is applied to the input terminal of said microprocessor.

4. The trainable transmitter as defined in claim 2, wherein said signal processor includes a voltage controlled oscillator and said digital-to-anolog converter is directly connected between said microprocessor and a frequency control input terminal of said voltage controlled oscillator.

5. The trainable transmitter as defined in claim 1, wherein said processor adjusts the frequency of said signal generator in response to the monitored frequency of the signal output from said signal generator.

6. The trainable transmitter as defined in claim 1, wherein said processor operates in a training mode and a transmitting mode, in the training mode said processor identifies the RF carrier frequency and data code of a signal received by said receiver and stores data representing the identified carrier frequency and data code, and in the transmitting mode said processor reads the stored data and generates a frequency control signal and a data signal to supply to said signal generator such that said signal generator may generate and transmit an RF signal having the same carrier frequency and data code of a signal received during the training mode.

7. A vehicle visor assembly including the trainable transmitter as defined in claim 1.

8. A vehicle rearview mirror assembly including the trainable transmitter as defined in claim 1.

9. A vehicle overhead console assembly including the trainable transmitter as defined in claim 1.

10. A trainable transmitter comprising:

a receiver for receiving a signal from a transmitter;

a signal generator for generating a signal having a frequency related to frequency control signal supplied to a frequency control terminal of said signal generator; and a processor directly coupled to the frequency control terminal of said signal generator for supplying the frequency control signal and directly coupled to an output terminal of said signal generator for monitoring the frequency of the signal output from said signal generator;

wherein said processor monitors the frequency of the signal output from said signal generator by determining when the level of the signal exceeds a threshold and measuring the time elapsed during which the signal level exceeds the threshold a predetermined number of times.

11. A transmitter for transmitting an RF signal to a receiver that is responsive to an amplitude-modulated RF signal having a predetermined data code and a carrier frequency within a predetermined frequency band to which the receiver is tuned, said transmitter comprising:

a signal generator for generating an RF carrier signal having a carrier frequency that is outside the predetermined frequency band of the receiver;

a frequency-dividing circuit coupled to an output of said signal generator, when enabled, said frequency-dividing circuit divides the frequency of the RF carrier signal to output a signal having a carrier frequency falling within the predetermined frequency band of the receiver, when disabled, said frequency-dividing circuit passes the RF carrier signal received from said signal generator without dividing its frequency;

a control circuit for generating a modulation signal representing the predetermined data code and supplying the modulation signal to said frequency—dividing circuit to selectively enable and disable said frequency-dividing circuit in response to the modulation signal such that said frequency-dividing circuit generates a modulated RF signal; and an antenna coupled to receive the modulated RF signal output from said frequency-dividing circuit and to transmit the modulated RF signal to the receiver.

12. A vehicle overhead console assembly including the transmitter as defined in claim 11.

13. A vehicle rearview mirror assembly including the transmitter as defined in claim 11.

14. A vehicle visor assembly including the transmitter as defined in claim 11.

15. The transmitter as defined in claim 11, wherein said signal generator includes a voltage controlled oscillator and wherein said control circuit includes a microprocessor and a digital-to-analog converter directly coupled between a frequency control signal output terminal of said microprocessor and a frequency control terminal of said voltage controlled oscillator.

16. The transmitter as defined in claim 15 wherein said microprocessor is coupled to an output terminal of said voltage controlled oscillator in order to measure and monitor the frequency of the signal generated by said voltage controlled oscillator.

17. The transmitter as defined in claim 11 and further including a transmit amplifier coupled between said frequency-dividing circuit and said antenna for amplifying the modulated RF signal generated by said frequency-dividing circuit.

18. The transmitter as defined in claim 17, wherein said transmit amplifier is coupled to said control circuit and is selectively enabled and disabled in response to the modulation signal supplied from said control circuit.

19. A trainable transmitter for learning characteristics of a received RF signal and for transmitting a modulated RF signal having the learned characteristics to a receiver that is responsive to RF signals having the characteristics learned by the trainable transmitter, the characteristics to which the receiver responds include an RF carrier frequency within a frequency band to which the receiver is tuned, said trainable transmitter comprising:

a receiver circuit for receiving RF signals from an original transmitter;

a control circuit coupled to said receiving circuit for identifying characteristics of a received RF signal including the carrier frequency and data code and storing data representing the identified characteristics when in a training mode, and when in a transmitting mode, said control circuit generates a modulation signal representing the data code and a frequency control signal representing a carrier frequency that is a multiple of the carrier frequency of a received RF signal and that is outside the frequency band to which the receiver is responsive;

a signal generator coupled to said control circuit for generating an RF carrier signal having the carrier frequency represented by the frequency control signal;

a frequency-dividing circuit coupled to an output of said signal generator and having an enable/disable terminal coupled to said control circuit for receiving the modulation signal so as to selectively enable and disable said frequency dividing circuit in accordance with the modulation signal to thereby generate a modulated RF signal, when enabled, said frequency-dividing circuit divides the frequency of the RF carrier signal to output a signal having a carrier frequency falling within the frequency band to which the receiver is responsive, when disabled, said frequency-dividing circuit passes the RF carrier signal received from said signal generator without dividing its frequency; and an antenna coupled to receive the modulated RF signal output from said frequency-dividing circuit and to transmit the modulated RF signal to the receiver.

20. A vehicle overhead console assembly including the trainable transmitter as defined in claim 19.

21. A vehicle rearview mirror assembly including the trainable transmitter as defined in claim 22.

22. A vehicle visor assembly including the trainable transmitter as defined in claim 19.

23. The trainable transmitter as defined in claim 19, wherein said signal generator includes:

a phase-locked loop circuit for generating a frequency control voltage in response to the frequency control signal received from said control circuit; and a voltage controlled oscillator having a frequency control input terminal for receiving the frequency control voltage generated by said phase-locked loop circuit, said voltage controlled oscillator generates the RF carrier signal output from said signal generator, the carrier frequency of the RF carrier signal generated by said voltage controlled oscillator corresponds to the voltage level of the frequency control voltage.

24. The trainable transmitter as defined in claim 23, wherein said voltage controlled oscillator generates RF carrier signals having carrier frequencies falling within the range of 440 MHz to 880 MHz, and said frequency-dividing circuit is a divide-by-2 circuit for selectively dividing the frequency of the RF carrier signals to fall within the range of 220 MHz to 440 MHz.

25. The trainable transmitter as defined in claim 19, and further including a transmit amplifier coupled between said frequency-dividing circuit and said antenna for amplifying the modulated RF signal generated by said frequency dividing circuit.

26. The trainable transmitter as defined in claim 25, wherein said transmit amplifier is coupled to said control circuit and is selectively enabled and disabled in response to the modulation signal supplied from said control circuit.

27. The trainable transmitter as defined in claim 19, wherein said antenna is a tunable antenna coupled to said control circuit for selectively tuning said tunable antenna.

28. The trainable transmitter as defined in claim 19, wherein said signal generator includes a voltage controlled oscillator and wherein said control circuit includes a microprocessor and a digital-to-analog converter directly coupled between a frequency control signal output terminal of said microprocessor and a frequency control terminal of said voltage controlled oscillator.

29. The trainable transmitter as defined in claim 28, wherein said microprocessor is coupled to an output terminal of said voltage controlled oscillator in order to measure and monitor the frequency of the signal generated by said voltage controlled oscillator.

30. A trainable transmitter comprising:

a receiver for receiving a signal from a transmitter;

a signal generator for generating an unmodulated signal having a frequency related to a frequency control signal supplied to a frequency control terminal of said signal generator; and a control circuit coupled to said receiver and to the frequency control terminal of said signal generator for supplying the frequency control signal, wherein said control circuit operates in a training mode and a transmission mode, in said training mode, said control circuit controls said signal generator and monitors a connection to said receiver so as to learn characteristics of the received signal including the carrier frequency thereof; during said transmission mode, said control circuit controls said signal generator to generate an unmodulated signal having the learned carrier frequency while modulating the generated signal after it is output from said signal generator such that said trainable transmitter transmits a modulated signal during said transmission mode, having a signal pulse variation greater than 10 dB.

31. The trainable transmitter as defined in claim 30, wherein said trainable transmitter transmits a modulated signal during said transmission mode, having a signal pulse variation of at least about 50 dB.

32. The trainable transmitter as defined in claim 30, and further including:

an antenna; and a multi-stage transmit amplifier coupled between said signal generator and said antenna, said multi-stage transmit amplifier having a first and a last stage having input terminals coupled to said control circuit for selectively enabling/disabling said first and last stages to thereby modulate the signal generated by said signal generator.

33. A signal generator for a trainable RF transmitter having a control circuit, said signal generator comprising:

a voltage controlled oscillator for generating an RF carrier signal having a carrier frequency corresponding to a voltage level applied to a frequency control terminal of said voltage controlled oscillator, wherein said carrier frequency of the RF carrier signal generated by said voltage controlled oscillator fall within a first frequency band that is M times greater that a second frequency band in which a responsive receiver may be tuned;

a phase-locked loop circuit coupled to the frequency control terminal and an output terminal of said voltage controlled oscillator, and to an output terminal of the control circuit, said phase-locked loop circuit receives a frequency control signal from the control circuit and applies a voltage level to the frequency control terminal of said voltage controlled oscillator that corresponds to the received voltage control signal; and a frequency-dividing circuit. coupled to the output terminal of said voltage controlled oscillator and having an enable/disable terminal coupled to the control circuit for receiving a modulation signal so as to selectively enable and disable said frequency-dividing circuit in accordance with the modulation signal to thereby generate a modulated RF signal, when enabled, said frequency-dividing circuit divides the frequency of the RF carrier signal by M to output a signal having a carrier frequency falling within the second frequency band, when disabled, said frequency dividing circuit passes the RF carrier signal received from said signal generator without dividing its frequency.

34. The signal generator as defined in claim 33 and further including a reference oscillator for generating a reference signal, wherein said phase-locked loop circuit is coupled to said reference oscillator to compare the frequency of the RF signal generated by said voltage controlled oscillator with that of the reference signal.

35. A trainable transmitter comprising:

a receiver for receiving a signal from a transmitter;

a signal generator including a differential voltage controlled oscillator for generating a signal having a frequency related to a frequency control signal supplied to a frequency control terminal of said signal generator; and a control circuit coupled to said receiver and to the frequency control terminal of said signal generator for supplying the frequency control signal so as to control the frequency of the signal generated by said differential voltage controlled oscillator.

36. The trainable transmitter as defined in claim 35, wherein said control circuit includes a processor that is directly coupled to an output terminal of said signal generator for monitoring the frequency of the signal output from said signal generator.

37. The trainable transmitter as defined in claim 35, wherein said signal generator further includes a phase-locked loop circuit coupled between the frequency control terminal and an input terminal of said differential voltage controlled oscillator and coupled to an output of said differential voltage controlled oscillator for monitoring the frequency of the signal generated by said differential voltage controlled oscillator and controlling the frequency of the signal output from said differential voltage controlled oscillator in response to the frequency control signal received from said control circuit.

38. The trainable transmitter as defined in claim 35, wherein said control circuit operates in a training mode and a transmission mode, in said training mode, said control circuit controls said signal generator and monitors a connection to said receiver so as to learn characteristics of the received signal including the carrier frequency thereof; during said transmission mode, said control circuit controls said signal generator to continuously generate a signal having the learned carrier frequency while modulating the generated signal after its output from said signal generator.

39. The trainable transmitter as defined in claim 38, wherein said trainable transmitter transmits a modulated signal during said transmission mode, having a signal pulse variation greater than 10 dB.

40. The trainable transmitter as defined in claim 38, wherein said trainable transmitter transmits a modulated signal during said transmission mode, having a signal pulse variation of at least about 50 dB.

41. The trainable transmitter as defined in claim 38, and further including:

an antenna; and a multi-stage transmit amplifier coupled between said signal generator and said antenna, said multi-stage transmit amplifier having a first and a last stage having input terminals coupled to said control circuit for selectively enabling/disabling said first and last stages to thereby modulate the signal generated by said signal generator.

42. A transmitter for transmitting a radio frequency signal to a receiver, comprising:

a signal generator for generating a signal having a frequency related to a frequency control signal supplied to a frequency control terminal of the signal generator; and a microprocessor coupled to an output terminal of the signal generator, wherein the microprocessor is configured to monitor the frequency of the signal output from the signal generator, to generate the frequency control signal based on the monitored frequency and to supply the frequency control signal to the frequency control terminal;

wherein the microprocessor is configured to monitor the frequency of the signal output from the signal generator by counting the number of signal generator oscillation cycles in each of a plurality of predetermined time periods, wherein the predetermined time periods are of different durations.

43. The transmitter of claim 42, further comprising a receiver for receiving a signal from a remote transmitter, wherein the transmitter is trainable.

44. The transmitter of claim 43, wherein the microprocessor operates in a training mode and a transmitting mode, wherein, in the training mode, the microprocessor is configured to identify the radio frequency carrier frequency and data code of the signal received by the receiver and to store data representing the identified carrier frequency and data code, and, in the transmitting mode, the microprocessor is configured to read the stored data and to generate the frequency control signal and a data signal to supply to the signal generator such that the signal generator may generate and transmit a radio frequency signal having the same carrier frequency and data code of the signal received during the training mode.

45. The transmitter of claim 42, wherein the transmitter does not include a phase-locked loop circuit.

46. The transmitter of claim 42, further comprising a digital-to-analog converter coupled between the microprocessor and the signal generator.

* * * * *

UNITED STATES PATENT AND TRADEMARK OFFICE

CERTIFICATE OF CORRECTION

PATENT NO. : 6,703,941 B1
DATED : March 9, 2004
INVENTOR(S) : David A. Blaker

It is certified that error appears in the above-identified patent and that said Letters Patent is hereby corrected as shown below:

<u>Column 16,</u>
Line 2, delete "22" and substitute -- 19 --.

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,703,941 B1
DATED : March 9, 2004
INVENTOR(S) : David A. Blaker

It is certified that error appears in the above-identified patent and that said Letters Patent is hereby corrected as shown below:

Column 16,
Line 21, delete "22" and substitute -- 19 --.

This certificate supersedes Certificate of Correction issued May 18, 2004.

Signed and Sealed this

Seventh Day of December, 2004

JON W. DUDAS
*Director of the United States Patent and Trademark Office*